United States Patent Office 3,121,043
Patented Feb. 11, 1964

3,121,043
SUSTAINED RELEASE PHARMACEUTICAL PREPARATION AND METHODS FOR MAKING SAME
Leonard C. Tobin, St. Louis County, and John B. Weber, St. Louis, Mo., assignors to Scientific Associates, Inc., St. Louis, Mo., a corporation of Missouri
No Drawing. Filed May 11, 1960, Ser. No. 28,201
8 Claims. (Cl. 167—82)

This invention relates to pharmaceutical preparations adapted for sustained release.

Heretofore, the efforts which have been made for treating medicaments to effect uniform and delayed release have consisted in the coating thereof with various materials adapted for slow disintegration, as through attrition. These materials, being generally referred to as "enteric coatings" are applied, by various well known means, upon the outer surfaces of customarily compressed tablets and of so-called "beads." However, all such coatings are merely physically united with the medicaments, or the containers therefor, as a capsule; there being no chemical relationship between the coating and the preparation, which coating thus serves nothing more than a shielding agent.

Therefore, it is an object of the present invention to provide pharmaceutical preparations constituting integrated chemical compounds which in addition to possessing pharmacologically active properties are adapted for sustained release so that the same may slowly provide over a relatively extended period of time the intended therapeutic treatment, thereby obviating the necessity of exterior coatings as presently required.

It is a further object of the present invention to provide a method for decreasing by chemical means the solubility of normally relatively highly soluble pharmaceutical preparations to adapt same for timed release or availability of the pharmaceutically active ingredient.

It is another object of the present invention to provide a method of preparing a chemical compound which incorporates a pharmacologically active agent and is resistant to reaction with acids and alkalis so that the active agent is absorbed and metabolized at a relatively slow rate.

It is an additional object of the present invention to provide a method whereby an extensive line of pharmaceutical preparations adapted for various therapeutic purposes are chemically bonded to a carboxylic acid polymer to form a compound having markedly less solubility than the reacting pharmaceutical preparation to render the compound adapted for sustained release.

It is a still further object of the present invention to provide a series of chemical compounds adapted for sustained release which are comprised of the salts and partial amide-partial amine salts formed from the neutralization of certain carboxylic acid polymers or reaction of certain anhydride containing polymers and pharmacologically active weak base amines.

In essence, the present invention contemplates the provision of pharmacologically active amine salt or partial amide-partial amine salt derivatives of lightly cross-linked polymers containing a plurality of carboxyl or anhydride groups on the main polymer chain. The lightly cross-linked polymeric acids or anhydrides are obtained by copolymerizing a monomeric alpha-beta-olefinically unsaturated aliphatic carboxylic acid having a $CH_2=$ group in a position beta to the carboxyl group such as acrylic, methacrylic or other alpha-substituted acrylic acids, or maleic acid or other alpha, beta-olefinically unsaturated acids or monomeric anhydrides of alpha, beta-olefinically unsaturated poly-basic acids, such as maleic anhydride and the like, with a small amount, usually 0.3 to about 15% by weight, based on the weight of the other polymerizable materials, of a polyalkenyl compound having a plurality of vinylidene groups. It is apparent that cross-linked copolymers can contain both carboxyl and anhydride groups. The resulting cross-linked carboxylic or anhydride containing copolymers have the ability to swell greatly in neutral or slightly alkaline aqueous media to form mucilages or gels, but the copolymers are not truly soluble either in aqueous media or in any known solvent.

The carboxyl containing copolymers can be converted to amine salts by mixing the copolymer with a pharmacologically active amine, regardless of whether the amino nitrogen contains any active hydrogen or not. With anhydride containing copolymers, derivatives having some amide and some amine salt groups can be obtained by reacting the anhydride form of the copolymer with a pharmacologically active amine having at least one active hydrogen atom on at least one amino group. In opening the anhydride group, one equivalent of amine having an active hydrogen will form an amide and one equivalent will form an amine salt. If the pharmacologically active amine has only tertiary amino groups, the anhydride ring will open to provide two amine salt groups. If desired, derivatives having more than one pharmacologically active amine chemically bound to the copolymer chain can be prepared. Thus, by neutralizing a carboxylic copolymer with a mixture of pharmacologically active amines or by progressively neutralizing the carboxyl groups with requisite amounts of individual amines, derivatives are formed in which the amine salts are of a mixed variety. Similarly, if a mixture of pharmacologically active amines having at least one active hydrogen atom is reacted with an anhydride containing copolymer the end product has a mixture of amide groups and a mixture of amine salt groups. The conversion to mixed amide-mixed amine salts, of course, can also be effected progressively by first reacting one amine and then one or more additional amines. In those copolymers having both anhydride and carboxylic groups, it is possible to form salts of the carboxyl groups with tertiary amines and half-amide half-amine salts with amines having at least one active hydrogen atom on the amino group. The preparation of amine salts and partial amide-partial amine salts of the copolymer can be effected in bulk or in dispersion in an inert diluent. When the parent copolymer contains anhydride groups, the preferred diluents are liquid hydrocarbons or halogenated hydrocarbons or other compounds which will not react with or open the anhydride group.

The amino compounds adapted for use in forming the salts of the present invention include a considerable number of agents having recognized pharmacological properties, such as, antihistamines, including, by way of example only, diphenhydramine, chlorphenamine, prophenpyridamine, methapyriline, dimenhydrinate, triplennamine, pyrilamine, etc.; various alkaloids and alkaloidal drugs, as by way of example only, pilocarpine, pilosine, brucine, ergotamine, physostigmine, reserpine, strychnine, yohimbine, berberine, codeine, emetine, mescaline, morphine, papaverine, lupanine, sparteine, ephedrine, amphetamine, sympathomimetic amines, phenylephrine, epinephrine, caffeine, theobromine, theophylline, anabasine, arecoline, lobeline, nicotine, cinchonine, quinacrine, quinine, quinidine, aconitine, jervine, veratridine, atropine, cocaine, homatropine, hyoscyamine, scopolamine, etc., and numerous other compounds, such as, piperazine, cyanocobalamine, phenazocine, betaine, choline, etc.

It has been found, however, that such amino compounds have common chemical properties which are critical for the formation of preparations of the present invention. Such compounds all possess basic properties and contain four or more carbon atoms. At least one nitrogen atom in each of such compounds is either (a) bonded to at least two aliphatic groups or hydrogen atoms, as in, for example only, Codeine:

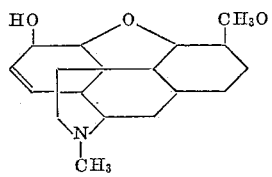

Piperazine:

Diphenhydramine (Benadryl):

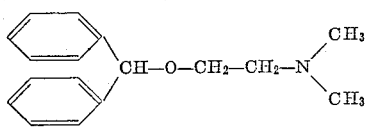

or (b) wherein at least one nitrogen atom forms a part of an aromatic ring, as in, for example only, Pyridine:

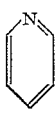

It is evident that many amino compounds of the type here in question will satisfy both of the aforesaid conditions, such as, for example, Pyrilamine:

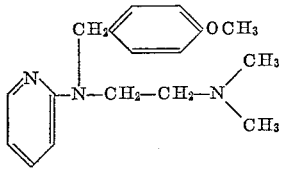

This group of amino compounds covers myriad pharmaceuticals currently used for a most extensive and varied range of medical and therapeutic purposes, such as, for anesthetics, anthelmintics, central nervous system stimulants, appetite depressants, relief of allergies, colds, etc., and the like.

In order that such preparations provide their intended beneficial results, it is normally requisite that the same be administered by a series of periodic doses, or, be adapted for timed disintegration whereby one dosage may provide the necessary therapy for a relatively extended period of time. However, at the present time, the only recognized method of so adapting such preparations for sustained release has been through the coating of the same by so-called "enteric coatings," which, as stated hereinabove, provide nothing more than a physical shield which disintegrates slowly as through attrition.

The solubility of these amino compounds in acid and alkali environments is relatively high so that without such enteric coatings as heretofore used the same could not be rendered adaptable for sustained release. Therefore, it has been found that the chemical reacting of these compounds with certain carboxylic acid polymers have produced a resultant compound having most limited solubility in acid and alkali climates so that such preparations will, upon administration, provide a slow release of a pharmaceutical agent to thereby provide therapeutic benefits over an extended period of time.

The carboxylic polymers useful for forming the compositions of this invention are prepared from a monomeric mixture comprising two essential monomeric ingredients, each in certain proportions to be stated hereinbelow, one being a monomeric alpha-beta olefinically-unsaturated carboxylic acid, such as acrylic acid, maleic acid, or anhydride, sorbic acid, and the like; and the other being a soluble polymer of an aliphatic conjugated diene or a polyalkenyl polyether of a polyhydric alcohol, which polyhydric alcohol contains at least 4 carbon atoms to which are attached at least 3 hydroxyl groups, the polyether containing more than one alkenyl ether group per molecule. It is known that neither maleic acid nor maleic anhydride will homopolymerize to provide high molecular weight polymers, so that when either of these monomers is employed it is essential to use in addition to the cross-linking ingredient another comonomer which will copolymerize with the maleic acid or maleic anhydride. If the comonomer is not homopolymerizable, at least equimolar ratios of maleic anhydride to the comonomer should be used, but if the comonomer is homopolymerizable, such as acrylic acid for instance, then equimolar or lower proportions of maleic anhydride or maleic acid can be used. Representative comonomers are olefinic hydrocarbons such as ethylene, the butylenes, pentene and styrene, alpha-methyl styrene and ring-substituted styrenes, vinyl esters of saturated aliphatic or aromatic acids, such as vinyl acetate, propionate, butyrate, oleate, etc., vinyl benzoate etc., alkyl vinyl ethers in which the alkyl group has from 1 to 10 carbon atoms, amides of acrylic or alpha-substituted acrylic acids, esters of saturated monohydric alcohols and an acrylic acid, vinyl chloride, vinylidene chloride acrylonitrile, vinyl pyridine, vinyl carbazole and vinyl pyrollidone.

Other monomeric materials may be present, if desired, with the production of water-insoluble, hydrolysis-resistant, acid and alkali-resistant carboxylic type polymers.

The carboxylic monomers useful in the production of the polymers of this invention are the olefinically-unsaturated carboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group thusly

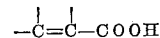

or as a part of a terminal methylene grouping thusly $CH_2=C<$. In the alpha-beta acids the close proximity of the strongly polar carboxyl group to the double-bonded carbon atoms has a strong activating influence rendering the substances containing this structure very readily polymerizable. Likewise, the presence of the terminal methylene grouping in a carboxylic monomer makes this type of compound much more easily polymerizable than if the double bond were intermediate in the carbon structure. Olefinically-unsaturated acids of this broad class includes such widely divergent materials as the acrylic acids such as acrylic acid itself, methacrylic acid, ethacrylic acid, alpha-chloro acrylic acid, alpha-cyano acrylic acid, and others, crotonic acid, beta-acryloxy propionic acid, hydrosorbic acid, sorbic acid, alpha-chloro sorbic acid, cinnamic acid, beta-styryl acrylic acid (1-carboxy-4-phenyl butadiene-1,3), hydromuconic acid, itaconic acid, citraconic acid, mesaconic acid, muconic acid, glutaconic acid, aconitic acid and others. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Anhydrides of the types formed by elimination of water from two or more molecules of the same or different unsaturated acids, such as acrylic anhydride, are not included because of the strong tendency of their polymers to hydrolyze in water and alkali.

It is ordinarily desirable to utilize, as the carboxylic monomer, one or more alpha-beta unsaturated carboxylic acids containing at least one carboxyl group, with the olefinic double bond alpha-beta to at least one carboxyl group. Illustrative alpha-beta unsaturated carboxylic acids of this nature include the acrylic acids disclosed above and in addition beta-methyl acrylic acid (crotonic acid), alpha-phenyl acrylic acid and others, hydrosorbic acid, alpha-butyl crotonic acid, angelic acid, cinnamic acid, m-chloro cinnamic acid, p-chloro cinnamic acid, umbellic acid, and other monoolefinic monocarboxylic acids; maleic acid, fumaric acid, hydromuconic acid, glutaconic acid, itaconic acid, citraconic acid, mesaconic acid, tricarboxy ethylene, tetracarboxy ethylene, and other monoolefinic di-an polycarboxylic acids; sorbic acid, beta-acryloxy acrylic acid, beta styryl acrylic acid (4-phenyl 1-carboxy butadiene-1,3) and other polyolefinic monocarboxylic acids; 3-carboxy-pentadiene-(2,4)oic-1, muconic acid, and other polyolefinic polycarboxylic acids; and maleic anhydride and other acid anhydrides having the general structure

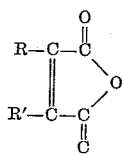

wherein R and R' are selected from the group consisting of hydrogen, halogen, cyanogen (—C≡N), hydroxyl, lactam and lactone groups and alkyl, aryl, alkaryl, aralkyl, and cycloalkyl groups such as methyl, ethyl, propyl which can also be termed lower alkyl groups, octyl, decyl, phenyl, tolyl, xylyl, benzyl, cyclohexyl and the like; and others.

The preferred carboxylic monomers for use in this invention are the monoolefinic acrylic acids having the general structure

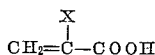

wherein X is a substituent selected from the class consisting of hydrogen, halogen, hydroxyl, carboxyl, amide, ester, lactone, lactam and the cyanogen (—C≡N) groups, and monovalent alkyl radicals, aryl radicals, alkaryl radicals, aralkyl radicals, and cycloaliphatic radicals. Illustrative acrylic acids of this preferred class are acrylic acid itself, methacrylic acid, ethacrylic acid, alpha-chloro acrylic acid, alpha-bromo acrylic acid, alpha-cyano acrylic acid, alpha-phenyl acrylic acid, alpha-benzyl acrylic acid, alpha-cyclohexyl acrylic acid, and others. The alpha-halo and alpha-cyano acrylic acids readily hydrolyze at the halogen or cyano substitution with the formation of hydroxyl (or lactone) and a second carboxyl group. Of this preferred class acrylic acid itself is most preferred because of its generally lower cost, ready availability, and ability to form superior polymers.

One of the cross-linking agents utilized in this invention to confer insolubility on the otherwise generally soluble carboxylic acid polymers may be any organic solvent soluble polymer of an alphatic conjugated diene which contains a substantial amount of unsaturation, that is, polymers made from monomeric mixtures containing 50% or more of a diene hydrocarbon. The residual unsaturation of these polymers, especially when it is present as side chain vinyl units thusly

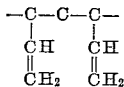

is believed to be responsible for the reaction with the carboxylic monomers. Double bonds intermediate of the diene polymer structure, or active methylenic hydrogens of the main diene polymer chain, may be involved in the reaction, although less probable than residual vinyl groups. Whichever mechanism is involved there is formed a three-dimensional network of long chains of carboxylic monomer units tied together with diene polymer chains. The carbon-to-carbon linkages established by this novel type of polymerization are exceedingly resistant to hydrolysis and other forms of chemical attack. As stated above the only critical characteristics for the diene polymer or polymeric cross-linking agent is that it be soluble in common organic solvents and contain greater than 50% diene units.

A preferred class of polymeric cross-linking agent is the soluble polymers of butadiene-1,3 hydrocarbons, that is, of butadiene-1,3 itself, isoprene, piperlylene, 1,2-dimethyl butadiene, and others, which are made from monomeric mixtures containing a substantial proportion of diene, preferably more than 50% of a diene hydrocarbon. A preferred class of these polymers may contain up to 50% of styrene, acrylonitrile, methyl methacrylate, methyl acrylate, acrylic acid, methacrylic acid, vinylidene chloride, vinyl pyridine, and other monoolefinic monomers. Of this class polybutadiene is most preferred because of its potentially greater degree of unsaturation and greater solubility in common solvents. The polymeric cross-linking agents described above may be made in any manner adapted to produce soluble polymers.

The polymerization of the carboxylic monomer in the presence of the polymeric conjugated aliphatic diene cross-linking agent may be carried out by various well known procedures, several of which are fully set forth and described in United States Patent No. 2,858,281. But, for purposes of the present invention, the said cross-linking agent should preferably be in the range of .5 to 5% parts by weight of the resulting interpolymer in order that the latter will have a relatively higher viscosity in neutral or slightly alkaline aqueous media, being in the nature of a gel. With greater proportionate amounts of the said cross-linking agent the interpolymers will be correspondingly more dimensionally stable and hence rigid, rendering the same unsuited for the present purposes.

Another type cross-linking agent useful for producing an insoluble carboxylic acid polymer of the type herein required may be the polyalkenyl polyethers containing more than one alkenyl ether grouping per molecule and those most useful possessing alkenyl groups in which an olefinic double bond is present attached to a terminal methylene grouping thusly $CH_2=C<$. They are made by the etherification of a polyhydric alcohol containing at least 4 carbon atoms and at least 3 hydroxyl groups. Compounds of this class are readily produced, for example, by a Williamson-type synthesis, in which an alkenyl halide, or a mixture of such halides, such as allyl chloride, allyl bromide, methallyl chloride, methallyl bromide and others, is reacted with a strongly alkaline aqueous solution of one or more of the polyhydric alcohols. The product of such a synthesis usually is a complex mixture of polyethers containing varying numbers of ether groups on each molecule. Analysis of such materials, therefore, reveals only the average number of ether groupings on each molecule. These mixtures, however, if they analyze as containing an average number of ether groups per molecule greater than one, are capable of producing the insoluble carboxylic polymers of this invention. Since the efficiency of the polyether cross-linking agent increases with the number of potentially polymerizable groups on the molecule, it is much preferred to utilize polyethers containing an average of two or more alkenyl ether groupings per molecule. The polyvinyl polyethers of the polyhydric alcohols within the above broad class are produced by reacting acetylene with the polyhydric alcohol (or an alcoholate thereof) in a Reppe-type vinylation synthesis. The polycrotyl ethers of the polyhydric alcohols also are useful although they do not contain a terminal $CH_2=C<$ grouping.

Illustrative polyhydric alcohols of the above-described class that may be utilized in the preparation of the polyalkenyl polyether cross-linking agent include the butane triols such as 1,2,3-butane triol, 2,3,4-trihydroxy butyric acid, the aldotetroses such as erythrose and threose, ketotetroses such as erythrulose; the aldopentoses such as arabinose, xylose, lyxose, and ribose; ketopentoses such as araboketose and xyloketose; aldohexoses such as glucose, galactose, mannose, gulose, idose, talose, allose and the like; ketohexoses such as fructose or levulose, sorbose and the like; other sugars including the mono-, di-, tri- and polysaccharides such as sucrose, maltose, lactose and raffinose; the hexosans, pentosans and hexosan-pentomans, the galactomannan and glucomannan gums, starch and other; reduced forms of the above and other sugars and polysaccharides such as the so-called "sugar alcohols" erythritol, xylitol, mono-, di- and tri-pentaerythritol, arabitol, mannitol, iditol, tolitol, sorbitol, inositol, dulcitol, and others; the oxidized derivatives of the sugars in which the oxidation has not been carried to the point where the original monosaccharide carbon chain unit is broken such as the mono- and di-carboxylic "sugar acids" including gluconic acid, glucuronic acid, galactonic acid, galacturonic acids, saccharic acid, mucic and pectic acids and other polyhydric alcohols of the class described.

A preferred class of polyhydric alcohols for use in the production of the polyalkenyl polyether monomer are known as the oligosaccharides, which are defined as containing from one to four monosaccharide units. In addition to the oligosaccharides, themselves, their reduction products such as the alcohols, keto-alcohols and aldoalcohols and their oxidation products which retain the original saccharide chain such as the sugar acids, the keto-acids, the aldo-acids and the like can be used. Illustrative saccharides of this class are the monosaccharides such as glucose, galactose, fructose, sorbose, rhamnose, and the like, disaccharides such as sucrose, arabinose, maltose, lactose, and the like, trisaccharides such as raffinose and others. Of these the disaccharide, sucrose, is much preferred because of its ready availability and its ability to produce polyethers of great reactivity with carboxylic monomers.

The preparation of interpolymers of the said carboxylic acid polymers and the polyalkenyl polyether type cross-linking agents or of multi-component interpolymers may be accomplished in accordance with certain methods and techniques of the type described in United States Letters Patent No. 2,798,053. But, for the aims of the present invention, it is desirable that such cross-linking agents be in amount within the range of approximately 1 to 2½% by weight of the interpolymer. Such low level cross-linked polymers in neutral or slightly alkaline aqueous media have a gum or gel-like character requisite for the present invention, whereas greater amounts thereof tend toward more rigid polymers which are inadequate for human consumption.

The following examples, which are intended as illustrative only, will more clearly demonstrate the preparation of the class of compounds made available for medicinal purposes by the present invention.

*Example I*

A dispersion containing one gram of a polymer of acrylic acid cross-linked with 1% of a polyallyl ether of sucrose having an average of about 5.8 allyl groups for each molecule of sucrose in ethyl alcohol was titrated with an alcoholic solution of amphetamine to a pH 7 as measured electrometrically. Complete neutralization required 350 mg. of amphetamine base per gram of the copolymer. The resulting precipitate was a rubber mass which was filtered out, broken into small pieces, and dried. The dry precipitate was an amorphous mass slowly swellable in water.

The salt-character of the precipitate was established by the precipitation of the same in ethyl alcohol, whereas amphetamine is soluble in the alcohol and the cross-linked co-polymer is readily dispersed therein.

*Example II*

A dispersion containing one gram of the cross-linked copolymer described in Example I in ethyl alcohol was titrated with an ethyl alcohol solution of ephedrine to pH 7 as measured electrometrically. Complete neutralization required 380 mg. of ephedrine per gram of the cross-linked copolymer. The resultant precipitate was a rubbery mass which was filtered out, then broken into small pieces, and dried. The dry precipitate was an amorphous mass slowly dispersible in water.

*Example III*

A dispersion containing one gram of the copolymer of Example I in ethyl alcohol was titrated with an ethyl alcohol solution of piperazine to pH 7, as measured electrometrically. Complete neutralization required 340 mg. of piperazine per gram of the copolymer. The resulting precipitate was relatively fine and was not the rubbery mass obtained in the two previously described examples. After drying the fine precipitate the same was discovered to be very slowly dispersible in water.

*Example IV*

A dispersion containing one gram of the copolymer of Example I (as above described) in ethyl alcohol was titrated with an ethyl alcohol solution of codeine to a pH 7. Complete neutralization required 950 mg. of codeine per gram of the copolymer. The resulting precipitate was relatively fine and upon drying was discovered to be very slowly dispersible in water.

In order to establish that the compounds of the present invention, being amino salts or partial amide-partial amine salts of cross-linked carboxylic acid polymers, possess the pharmaceutical activity of the reacting amine as well as being capable of sustained release, extensive experiments were carried out, both in vitro and in vivo. Results of the in vitro determination or rate of disintegration of a compound formed by neutralization of the copolymer with amphetamine as measured by the Wiley method were as follows.

| Time: | Percent released |
|---|---|
| 1 hour | 59.8 |
| 2 hours | 4.9 |
| 3 hours | 10.5 |
| 4 hours | 5.6 |
| Residue remaining at end of fourth hour | 16.5 |

In vivo disintegration or release was determined by measuring amphetamine excreted in urine by the method of Chapman, Shenoy and Campbell, Food and Drug Laboratories, Dept. of National Health and Welfare, Canada. The excretion rate of amphetamine-cross-linked copolymer complex salt was compared with those of amphetamine sulfate. The subjects were given amounts of both salts to yield an equivalent amount of amphetamine base. The result of the determinations were as follows:

| Time | Mcg./min. excreted Amphetamine Sulfate | Mcg./min. excreted Amphetamine-Copolymer Complex |
|---|---|---|
| 1 Hour | 1.09 | 0.0 |
| 3 Hours | 4.09 | 5.5 |
| 5 Hours | 6.37 | 2.8 |
| 7 Hours | 7.33 | 2.2 |
| 8 Hours | 3.32 | 5.3 |
| 10 Hours | | 2.3 |
| 12 Hours | | 5.0 |
| 12-24 Hours | 1.92 | 0.9 |

From a study of the foregoing table, it is apparent that the amphetamine-copolymer complex is excreted at a much more uniform rate than is the amphetamine sulfate. A sustained release preparation should establish therapeutic blood levels and maintain the same over a stated period of time. This would indicate that the urinary excretion of the drug must also be relatively constant. From the above data, it can be seen that the excretion rate of the amphetamine sulfate increased uniformly to a maximum rate at the end of 7 hours, after which it declined to a minimum at the end of 24 hours. The amphetamine-copolymer complex was excreted at a nearly constant rate from the end of the third hour to the end of the twelfth hour, indicating that the complex possessed sustained release capabilities.

*Example V*

To a dispersion in iso-octane containing 10 grams of a copolymer of maleic anhydride and isobutylene cross-linked with 3% 1,2-polybutadine were added two drops of triethylamine as a catalyst and 6 g. 1-amphetamine base. This mixture was then stirred at 50° C. for four hours. At the end of this period, the mixture was filtered, and the precipitate washed with iso-octane and dried. The precipitate was then assayed for amphetamine content which demonstrated that the salt formed had an amphetamine content of 8.4%.

Determinations were made in vitro for establishing the time delay properties of rate of release of the salt. The results of these determinations are as follows.

| Time: | Percentage of amphetamine released, percent |
|---|---|
| 1½ hrs. | 47.2 |
| 4 hrs. | 18.9 |
| 6 hrs. | 17.1 |
| Residue | 19.7 |

*Example VI*

To a dispersion in iso-octane containing 10 grams of a copolymer of maleic anhydride and isobutylene cross-linked with 3% allyl pentaerythritol having 3 to 4 allyl groups per molecule were added two drops of triethylamine as a catalyst and 6 g. 1-amphetamine base. This mixture was then stirred at 50° C. for six hours. At the end of this period, the mixture was filtered, and the precipitate dried. The precipitate was then assayed for amphetamine content which demonstrated that the salt formed had an amphetamine content of 6.4%.

Determinations were made in vitro for establishing the time delay in properties or rate of release of the salt. The results of these determinations are as follows.

| Time: | Percentage of amphetamine released, percent |
|---|---|
| 1½ hrs. | 34.7 |
| 4 hours | 9.7 |
| 6 hours | 16.0 |
| Residue | 39.0 |

Tests relative to the releasing action of the complex salts of Examples V and VI demonstrate most convincingly that by any reasonable standard in vivo determinations would be in immediate correspondence.

Therefore, in view of the foregoing, it is readily recognized that the pharmaceutical prepartions of the present invention possess optimum time delay release so that a single dosage will provide a consistently high level, desired therapeutic effect over a relatively extended period of time.

It is understood that changes in the methods, compositions, percentages, and combinations set forth can be made without departing from the nature and principle of our invention.

Having thus described our invention what we claim and desire to secure by Letters Patent is—

1. A sustained release, pharmaceutical preparation consisting essentially of the reaction product of a pharmacologically active, amino compound having at least four carbon atoms and being basic, and an interpolymer formed by a mixture of monomers of at least one carboxylic acid selected from the group consisting of olefinically unsaturated acids and the anhydrides thereof wherein the anhydride group is formed by the elimination of one molecule of water from two carboxylic groups located on the same polycarboxylic acid molecule, with a cross-linking agent selected from the group consisting of an aliphatic conjugated diene from the group consisting of polymers of butadiene-1,3, isoprene, piperylene, and 1,2-di-methyl butadiene and a polyalkenyl polyether of a polyhydric alcohol, said preparation being less soluble than the reacting pharmacologically active compound.

2. A sustained release, pharmaceutical preparation consisting essentially of the reaction product of a pharmacologically active, amino compound having at least four carbon atoms and being basic, and wherein at least one nitrogen atom is bonded by two of its bonds to a member from the group consisting of aliphatic groups, hydrogen atoms, and an aromatic ring, and an interpolymer formed by a mixture of monomers of at least one carboxylic acid selected from the group consisting of olefinically unsaturated acids and the anhydrides thereof wherein the anhydride group is formed by the elimination of one molecule of water from two carboxylic groups located on the same polycarboxylic acid molecule, with a cross-linking agent selected from the group consisting of an aliphatic conjugated diene from the group consisting of polymers of butadiene-1,3, isoprene, piperylene, and 1,2-di-methyl butadiene and a polyalkenyl polyether of a polyhydric alcohol, said preparation being less soluble than the reacting pharmacologically active compound.

3. A sustained release, pharmaceutical preparation consisting essentially of the reaction product of a pharmacologically active, amino compound having at least four carbon atoms and being basic, and wherein at least one nitrogen atom is bonded by two of its bonds to a member of the group consisting of aliphatic groups, hydrogen atoms and an aromatic ring, and an interpolymer formed by a mixture of monomers of at least one carboxylic acid selected from the group consisting of olefinically unsaturated acids and the anhydrides thereof wherein the anhydride group is formed by the elimination of one molecule of water from two carboxylic groups located on the same polycarboxylic acid molecule, and with a soluble polymer of an aliphatic conjugated diene from the group consisting of polymers of butadiene-1,3, isoprene, piperylene, and 1,2-di-methyl butadiene, said preparation being less soluble than the reacting pharmacologically active compound.

4. A sustained release, pharmaceutical preparation consisting essentially of the reaction product of a pharmacologically active, amino compound having at least four carbon atoms and being basic, and an interpolymer formed by a mixture of 95 to 99.5% by weight of monomers of at least one carboxylic acid selected from the group consisting of olefinically unsaturated acids and the anhydrides thereof wherein the anhydride group is formed by the elimination of one molecule of water from two carboxylic groups located on the same polycarboxylic acid molecule, with from about 5 to .5% by weight of a soluble polymer of an aliphatic conjugated diene from the group consisting of polymers of butadiene-1,3, isoprene, piperylene, and 1,2-di-methyl butadiene, said preparation being less soluble than the reacting pharmacologically active compound.

5. A sustained release, pharmaceutical preparation consisting essentially of the reaction product of a pharmacologically active, amino compound having at least four carbon atoms and being basic, and wherein at least one nitrogen atom is bonded by two of its bonds to a member of the group consisting of aliphatic groups, hydrogen atoms, and an aromatic ring, and an interpolymer formed by a mixture of monomers of at least one carboxylic acid selected from the group consisting of olefinically unsaturated acids and the anhydrides thereof wherein the anhydride group is formed by the elimination of one molecule of water from two carboxylic groups located on the same polycarboxylic acid molecule, with a polyalkenyl polyether of a polyhydric alcohol in which the polyhydric alcohol contains at least 4 carbon atoms to which are attached three hydroxyl groups, the polyether containing more than one alkenyl ether group per molecule, said preparation being less soluble than the reacting pharmacologically active compound.

6. A sustained release, pharmaceutical preparation consisting essentially of the reaction product of a pharmacologically active, amino compound having at least four carbon atoms and being basic, and an interpolymer formed by a mixture of 97.5 to 99% by weight of monomers of at least one carboxylic acid selected from the group consisting of olefinically unsaturated acids and the anhydrides thereof wherein the anhydride group is formed by the elimination of one molecule of water from two carboxylic groups located on the same polycarboxylic acid molecule, with from about 2.5 to 1% by weight with a polyalkenyl polyether of a polyhydric alcohol in which the polyhydric alcohol contains at least 4 carbon atoms to which are attached 3 hydroxyl groups, the polyether containing more than one alkenyl ether group per molecule, said preparation being less soluble than the reacting pharmacologically active compound.

7. A method for preparing a sustained release pharmaceutical preparation comprising mixing together (I) a cross-linked copolymer of (A) a member selected from the group consisting of (1) an alpha-beta olefinically unsaturated carboxylic acid having a terminal $CH_2=$ group in a position beta to the carboxyl group, and (2) a mixture of maleic anhydride and at least one different monoolefinically unsaturated monomer copolymerizable therewith and (B) from 0.5 to about 15 parts by weight based on the weight of A of a cross-linking ingredient having a plurality of $CH_2=$ groups and being copolymerizable with said A and (II) a pharmaceutically active amine having at least four carbon atoms and being weakly basic, said amine having at least one nitrogen atom bonded by two of its bonds to a member selected from the class consisting of hydrogen, aliphatic groups and two carbon atoms of a heterocyclic ring, the proportions of said amine being such as to substantially neutralize the carboxyl groups on said interpolymer and to convert any anhydride groups to amine salts and a mixture of amide and amine salt groups.

8. A sustained release, pharmaceutical preparation consisting essentially of the reaction product of a pharmacologically active, amino compound having at least four carbon atoms and being basic, and an interpolymer formed by a mixture of monomers of at least one carboxylic acid selected from the group consisting of olefinically unsaturated acids and the anhydrides thereof wherein the anhydride group is formed by the elimination of one molecule of water from two carboxylic groups located on the same polycarboxylic acid molecule, with a cross-linking agent selected from the group consisting of an aliphatic conjugated diene from the group consisting of polymers of butadiene-1,3, isoprene, piperylene, and 1,2-di-methyl butadiene and a polyalkenyl polyether of a polyhydric alcohol, said cross-linking agent being in the range of .5 to 5 percent parts by weight of the interpolymer, the amount of said pharmacologically active compound per gram of interpolymer being within the range of approximately 300 to 1,000 milligrams, said pharmaceutical preparation being less soluble than the reacting pharmacologically active compound.

References Cited in the file of this patent

UNITED STATES PATENTS

| 2,607,762 | Bowen | Aug. 19, 1952 |
| 2,798,053 | Brown | July 2, 1957 |
| 2,858,281 | Bauman et al. | Oct. 28, 1958 |
| 2,938,892 | Sheehan | May 31, 1960 |
| 2,988,539 | Cohen et al. | June 13, 1961 |

OTHER REFERENCES

Journal of Medicinal and Pharmaceutical Chemistry, vol. I, No. 5, October 1959, pp. 467–500.